Figure 1:
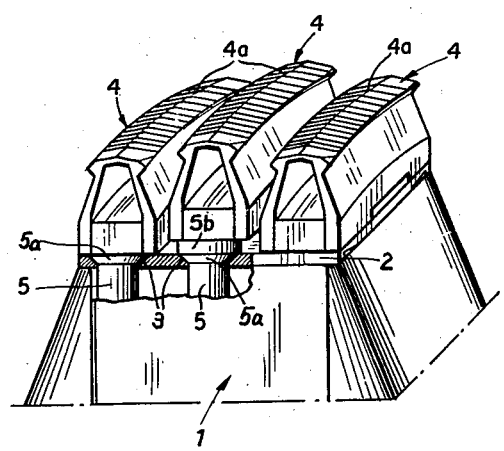

June 9, 1964 V. KOBLER ETAL 3,136,055
DRY SHAVERS HAVING SHEARHEADS ARRANGED AT DIFFERENT LEVELS
Filed Aug. 12, 1960 3 Sheets-Sheet 1

United States Patent Office 3,136,055
Patented June 9, 1964

3,136,055
DRY SHAVERS HAVING SHEARHEADS
ARRANGED AT DIFFERENT LEVELS
Victor Kobler, 42 Huttenstrasse, and Werner Kobler, 43 Huttenstrasse, both of Zurich, Switzerland
Filed Aug. 12, 1960, Ser. No. 49,245
Claims priority, application Switzerland Aug. 24, 1959
4 Claims. (Cl. 30—43)

The present invention relates to dry shaving razors of the type comprising at least two elongated shear heads situated side by side, which heads are provided each with an external shear comb, each having three operating edges situated on both sides of a mean plane extending in the longitudinal direction of the shear head, and each having an internal cutting blade movable to-and-fro.

It is usual practice to releasably secure the shear heads to the front end of a handle formed as a casing for a driving motor. In known devices of this type the said front end of the motor casing is covered by a plane cover plate traversed by plug pins of two or more identical shear heads; the plug pins being fixed below the plate by means of a releasable locking mechanism. In these known devices all shear heads rest with the plane bottoms of their shear combs upon the cover plate, so that the common line of contact of the outer operating surface of all shear combs extending transversely to the longitudinal axis of the shear head is a straight line at any point longitudinally of the shear heads. However, constructions are also known, in which the mean longitudinal planes of the shear heads do not extend parallel to each other as in the previously mentioned construction, but are inclined and intersect on a straight line parallel to the longitudinal middle axes of the shear heads. The shear heads thus diverge outwardly, so that the common line of contact of the operating surfaces of all shear combs, extending transversely to the longitudinal axis of the shear head, is a circular arc having its center on the said intersecting straight line. Though an obviously desired curvature of the total shearing surface in transverse direction is thereby obtained, apparent disadvantages will result therefrom. These drawbacks become evident, particularly in the case of shear heads having completely traversing cutting gaps and/or operating surfaces of rooflike cross-section, in that the edges of the operating surfaces of the shear heads which are of particular importance for stretching the skin and catching the hairs are always situated within the range of alignment of an enveloping surface of circularly curved cross-section; these edges of the middle shear combs or shear comb thus cannot become effective at all. The known parallel or inclined positioning of the shear heads thus affords only an enlargement of the total shearing surface corresponding to the number of shear heads, but does not result in any increase of the effective shearing edges. In the dry-shaver according to the present invention this disadvantage is avoided. The device according to the invention comprises three shear heads which are so disposed that in an operating position of the shear heads at least two operating edges facing each other, of two adjacent shear heads, are differently spaced from a plane which encloses equal angles with both mean longitudinal planes of these shear heads.

Owing to the resulting offset arrangement of the operating surfaces in transverse direction by raising a shear head, the edges of the operating surface of this shear head are arranged out of alignment with those of the adjacent shear head or shear heads and thus may be brought to full action.

Figure 4:
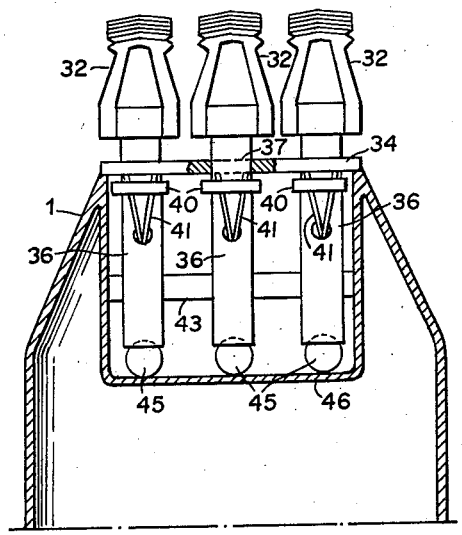
Figure 2:
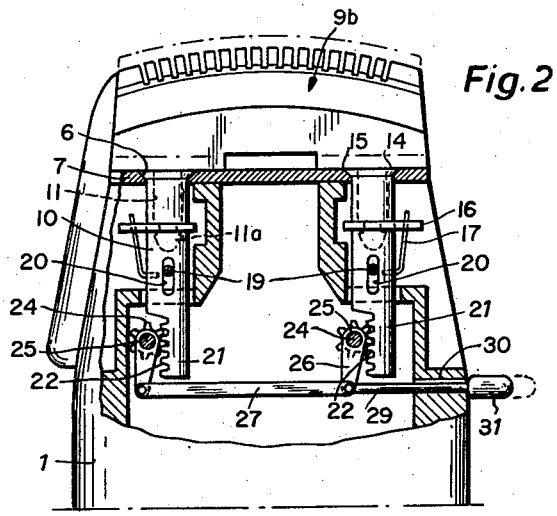
Figure 3:
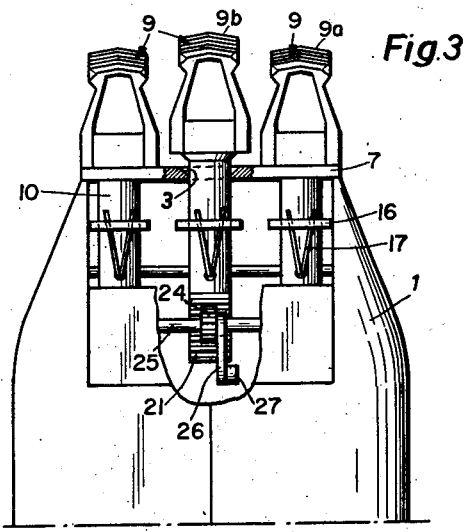
Figure 5:
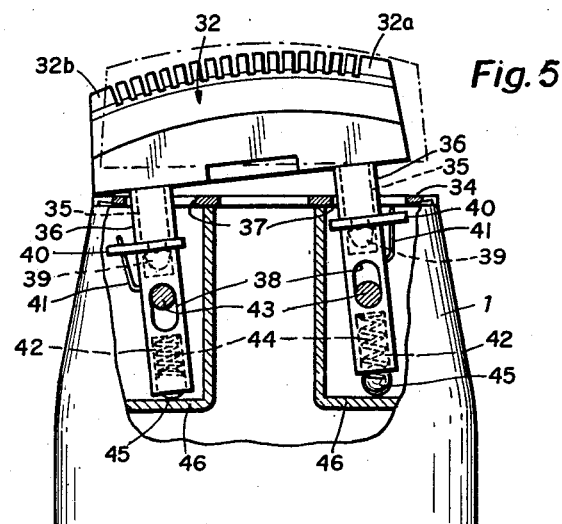
Figure 6:
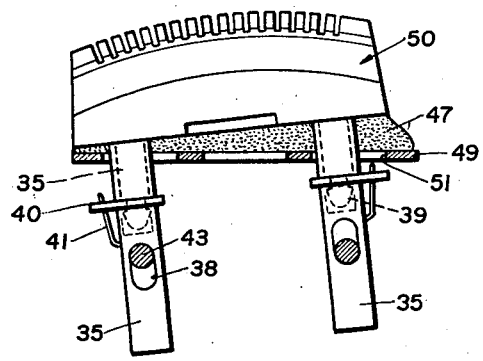

The present invention will now be described in more detail with reference to the accompanying drawings illustrating, by way of example, several embodiments of the invention and in which:

FIGURE 1 is a perspective view of a first example showing three shear heads staggered in elevation with respect to each other, FIGURE 2 is an elevation, partly in longitudinal section, of the top portion of a modified embodiment of a dry-shaver having a middle shear head which is adjustable with respect to height, FIGURE 3 is a side elevational view partly broken away of the dry-shaver shown in FIGURE 2, FIGURE 4 is a side elevation partly in section of the top portion of a modified embodiment of a dry-shaver having resiliently mounted shear heads, and FIGURE 5 is an elevation partly in section and broken away of the embodiment according to FIG. 4, FIGURE 6 shows a detail of a modification to FIGURE 5.

Referring to the drawings, the numeral 1 is the only partly shown elongate casing, formed as a handgrip, of an electric driving motor, not illustrated, of the device. In all examples shown the tapered end portion of the casing 1 is covered by a plane cover plate 2.

In the embodiment according to FIGURE 1 the cover plate 2 is provided with three rows of conically countersunk bores 3. Plug pins 5 of the three identically formed shear heads 4 protrude through these bores 3. These pins 5, engaging with a conical thickening 5a the cone surfaces of the countersunk bores 3, are releasably fixed underneath the cover plate 2 in a manner known per se; after loosening this fixed condition, the shear heads 4 can be individually removed from the cover plate 2. Each shear head 4 possesses an elongated external shear comb 4a with an operating section which is outwardly curved in the longitudinal direction and in transverse direction inclined in rooflike manner; this operating section is provided with transverse through-extending slots and with intervening webs. A reciprocally drivable internal cutter, not shown, is guided in conventional manner in the interior of the shear combs. In the two outer shear heads 4 the conical thickening 5a of the pins 5 are provided immediately on the bottom of the outer shear comb, so that this bottom abuts directly against the cover plate 2. In contradistinction thereto, in the intermediate shear head 4 a cylindrical shaft part 5b is provided between the conical thickening 5a of the pins 5 and the bottom of the external shear comb, so that this shear head in comparison with the adjacent shear heads is raised above the cover plate 2 by the height of the shaft part 5b. Thus, in spite of the provision of a plane cover plate 2 and of parallel mean longitudinal planes of the identical shear heads, a total operating surface of the device is obtained, which is offset in transverse direction, since the operating edges of the middle shear head have a different spacing from the plane of the cover plate 2, extending at right angles to the mean longitudinal planes of the shear heads 4.

This fact in combination with the longitudinal curvature of the individual operating surfaces of the shear heads results in a perfect stretching of the skin during shaving, namely in two directions extending at right angles to each other. However, on the other hand due to the described arrangement of the shear heads, also the longitudinal edges of the operating surface of the intermediate shear head are out of alignment with the surface containing the longitudinal edges of the outer shear heads. This free exposure of the operating surface with its longitudinal edges of the middle shear head insures an effective catching of the hairs also within the total operating surface of the device, and accordingly a complete utilization of the plurality of cutting edges obtained by the provision of several shear heads.

In place of the shear heads shown of longitudinally curved formation and rooflike cross-section, shear heads could also be provided, having an operating surface which is plane or of curved cross-section. While in the example illustrated three shear heads are provided, more than three shear heads could also be used; in an arrangement with four shear heads only two heads, namely the two middle shear heads, can be disposed so as to be raised in the manner described. Instead of using identical shear heads and raising the middle head or heads by elongating the plug pins, the raised shear heads themselves could be formed so as to have their combs on a correspondingly higher level.

The same effect can also be obtained with devices, in which the mean longitudinal planes of the shear heads do not extend parallel but at an angle to each other. Instead of arranging for instance the operating edges of all shear heads on a cylindrical surface (having an axis situated in the intersecting line of the mean longitudinal planes), the operating edges of one or more shear heads may also be situated entirely or partly outside of this cylindrical surface.

According to FIGURES 2 and 3 three pairs of holes 6 are arranged so as to be situated side by side in the cover plate 7 of the casing 1, these holes 6 being countersunk conically. Situated on the cover plate 7 are three identical elongate shear heads 9 extending parallel to each other; the outer shear combs 9a of the heads 9 are provided with transverse through-extending cutting slots, and contain an internal cutter, not shown, arranged to be movable to-and-fro. Plug sleeves 10 for the plug pins 11 of the shear heads 9 project through the holes 6 in cover plate 7 into the interior of the casing; with the shear heads 9 resting upon the cover plate 7 a conical thickening 14 of the plug sleeves 10 is seated in the conical countersunk portion 15 of the holes 6. The plug pins 11 have a set-off head 11a, behind which a small locking plate 16 engages, which is retained in the operating position shown by means of a spring 17 anchored on the corresponding plug sleeve 10 and thereby holds the plug pins 11 securely in the sleeves 10. By urging the locking plate 16 inwardly, the latter releases the plug pin 11, so that the respective shear head 9 can be removed.

The plug sleeves 10 of the intermediate shear head 9 are guided for limited movement in the holes 6 of the cover plate 7 by means of fixed cross pins 19 projecting into longitudinal slots 20 of the sleeves. The lower end portion 21 of these plug sleeves 10 are formed as racks 22 which are in engagement with toothed gear wheels 24. The two gear wheels 24 are carried each by shafts 25 mounted in the casing 1 and in addition are rigidly connected to a link 26. The free ends of the two links 26 are pivoted to a lever 27 connected to an actuating rod 29; the latter projects through a wall opening 30 of the casing 1 and carries a fingerpiece 31 at its outer end.

FIGURE 2 shows the middle shear head 9b in its lower position of adjustment, in which it abuts against the cover plate 7. When the rod 29 is pulled outwards into the position indicated by dot and dash lines by means of the finger-piece 31, the links 26 are turned to the same extent in counter-clockwise direction by means of the lever 27, which operation results into a corresponding rotation of the gear wheels 24. The two racks 22 and thus also the plug sleeves 10 are raised (FIGURE 3), which carry the shear head 9b by means of the plug pins 11. The operating surface of the intermediate shear head 9b, which surface is provided with crosswise traversable cutting gaps and curved in longitudinal direction of the shear head and of rooflike cross-section, is brought out of alignment with the operating surfaces of the adjacent shear heads, so that the longitudinal edges thereof will be exposed and thus become fully effective, similar to the outer longitudinal edges of the adjacent shear heads. Owing to the described formation of the adjusting means, the middle shear head can be raised to any desired level within the total adjusting range, remaining parallel to the cover plate. Instead of using racks and gear wheels the plug sleeves could also be adjusted in height by means of adjusting cams cooperating with the lower ends of the plug sleeves.

FIGURES 4 and 5 illustrate an embodiment of the invention in which three shearheads 32 are resiliently mounted in extended positions, that is, raised above cover plate 34, but are individually resiliently yieldable to retract toward the cover plate in order to conform to the general conformation of the surface being shaved thereby respectively. Each shearhead is provided with a pair of pins 35, FIG. 5, spaced apart longitudinally, and said pins extend into sleeves 36, which extend into the case 1 through longitudinally extending slots 37 in the cover plate 34.

Pins 35 are provided with locking heads 39 which are engaged by slidable locking plates 40, pressed into locking position by bent flat springs 41 mounted on sleeves 36.

Sleeves 36 are provided at their innermost ends with bores 42 each accommodating a resilient coil spring 44 (FIG. 4) the bottom ends of which each engages a small sphere 45 which engage against transverse partition plates 46 in the casing. The spheres are of such small size as to be able to enter bores 42. The length of sleeves 36 is such that even when they are in their outermost positions the spheres 45 remain partially within the bores 42 and can not escape therefrom.

In order to provide guidance and limits to the movements of the sleeves 36 they are each provided with a longitudinally extending slot 38 (FIG. 5) through which extend rods or pins 43 fixed in the casing.

In FIG. 5, dash-dot lines represent the most extended positions of the shearhead, while the solid lines show shearhead 32 extended at one end 32a and retracted at the other end 32b. It will be observed that the spring 44 at the retracted end is compressed and its corresponding sphere 45 has almost completely entered its bore 42 while at the other end of the spring 44 is extended and sphere is pressed nearly completely out of its bore 42.

In operation any or all of the shearheads are resiliently yieldable and tippable to accommodate their positions to the general conformation of the surfaces being shaved thereby respectively.

It will be obvious that the structure according to the embodiment of FIGS. 4 and 5 is applicable to a shaver having only one shearhead instead of the plurality of shearheads illustrated in FIG. 4. When in place of the slots 33, circular holes of correspondingly large diameter are provided, and instead of straight cross pins 43 such pins which are suitably curved, then the shear head can also be inclined to a limited extent in transverse direction.

A modification of the previously described example is illustrated in FIGURE 6. In place of the springs 44, which are supported by means of the spheres 45 in the casing 1 and in the plug sleeves 36, a pad 47 of elastic material, for example rubber or synthetic material, is arranged above the cover plate 49 for the resilient mounting of the shear head 50. Also in this construction the holes 51 of the cover plate 49 may be longitudinal slots or circular holes; in the former case the shear head in spite of the universal resiliency of the pad 47 is movable only in its mean longitudinal plane parallel or at an incline to the cover plate, while in the second case the shear head may be movable to a limited extent in all directions. In other respects the mounting means of shear head 50 of FIG. 6 are similar to those of FIG. 5 and bear the same reference characters.

With shear heads adjustable to inclined position the longitudinally curved head as provided in the examples shown is of advantage, since even with the shear head in inclined position, the ends of shear combs will not disturb the shaving operation.

In the above description it has always been assumed that the offset or adjustable shear head or heads project above beyond the adjacent shear heads; however, it is also possible to lower the position of one or more shear heads, or to mount the shear heads in such resilient manner that they will be urged to a lower position when the dry-shaver is in use.

We claim:

1. A dry shaver comprising three elongated shear heads situated side by side, each of said shear heads having an external shear comb provided with transverse through-extending slots, said heads having bridges between said slots which are convex, said shear combs having relative operating positions in which two comb edges facing each other of two adjacent shear heads are unequally spaced from a plane which lies at right angles to the longitudinal median planes of said two shear heads, said shaver having a casing provided with a cover plate, and at least one of said shear heads being adjustably mounted with respect to its height above said cover plate of the casing, said cover plate having a pair of plug sleeves extending perpendicularly therefrom on the opposite side from said shear heads, said plug sleeves having guide slots extending longitudinally thereof, said cover plate having openings therein registering with said plug sleeves, said adjustable shear comb having plug-pins extending through said openings into said plug sleeves and having cross pins protruding transversely therefrom into said guide slots of said plug sleeves, means resiliently supporting said adjustable shear head above said cover plate, and means for releasably anchoring said plug pins of said adjustable shear head.

2. A dry shaver according to claim 1 and in which the means resiliently supporting said adjustable shear head comprises spring supported by said plug sleeves and balls engaging said springs and supported by an inner portion of said casing.

3. A dry shear head according to claim 1 and in which said openings in said cover plate are elongated in the longitudinal direction of said adjustable shear head in order to enable said adjustable shear head to assume an inclined position relative to said cover plate.

4. A dry shear head according to claim 1, and in which said openings in said cover are circular holes of larger diameter than said plugs in order to enable a universally inclined positioning of said adjustable shear head with respect to said cover plate.

References Cited in the file of this patent

UNITED STATES PATENTS

| | | |
|---|---|---|
| 2,164,425 | Rand | July 4, 1939 |
| 2,177,791 | Smith | Oct. 31, 1939 |
| 2,203,021 | Jones | June 4, 1940 |
| 2,232,717 | Monnet | Feb. 25, 1941 |
| 2,335,413 | Hicks | Nov. 30, 1943 |
| 2,379,969 | Kobler et al. | July 10, 1945 |
| 2,559,772 | Kobler et al. | July 10, 1951 |
| 2,574,317 | Berg | Nov. 6, 1951 |
| 2,611,175 | Kobler et al. | Sept. 23, 1952 |
| 2,670,534 | Haber | Mar. 2, 1954 |
| 2,968,095 | Pejean | Jan. 17, 1961 |

FOREIGN PATENTS

| | | |
|---|---|---|
| 619,899 | Great Britain | Mar. 16, 1949 |